United States Patent
Wakatsuki

(10) Patent No.: US 8,485,292 B2
(45) Date of Patent: Jul. 16, 2013

(54) HYBRID VEHICLE COOLING APPARATUS

(75) Inventor: Sunao Wakatsuki, Shizuoka-ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 335 days.

(21) Appl. No.: 12/889,661

(22) Filed: Sep. 24, 2010

(65) Prior Publication Data

US 2011/0073394 A1    Mar. 31, 2011

(30) Foreign Application Priority Data

Sep. 25, 2009 (JP) ................. 2009-219973

(51) Int. Cl.
| | |
|---|---|
| B60K 6/42 | (2007.10) |
| B60K 6/20 | (2007.10) |
| B60K 11/04 | (2006.01) |
| B60K 1/00 | (2006.01) |
| F01P 5/10 | (2006.01) |
| F04B 17/00 | (2006.01) |
| F04B 35/04 | (2006.01) |

(52) U.S. Cl.
USPC ........... 180/65.22; 180/65.21; 180/68.4; 180/291; 123/41.44; 417/363; 417/423.15

(58) Field of Classification Search
USPC ........... 180/65.21, 68.4, 65.22, 291; 165/67, 165/69; 417/363, 423.15; 123/41.44, 41.45, 123/41.46, 41.47
See application file for complete search history.

(56) References Cited

U.S. PATENT DOCUMENTS

| | | | | |
|---|---|---|---|---|
| 4,447,034 | A * | 5/1984 | Gottlob ................. | 248/634 |
| 6,464,033 | B2 * | 10/2002 | Izumi et al. ............ | 180/291 |
| 6,491,504 | B2 * | 12/2002 | Nakagaki et al. ...... | 417/363 |
| 6,568,494 | B2 * | 5/2003 | Takahashi ............. | 180/68.4 |
| 6,810,989 | B1 * | 11/2004 | Dantlgraber et al. .. | 181/202 |
| 6,949,041 | B2 * | 9/2005 | Fujioka et al. ........ | 475/5 |
| 7,575,088 | B2 * | 8/2009 | Mir et al. .............. | 180/300 |
| 2006/0101645 | A1 * | 5/2006 | Stone ..................... | 29/897.2 |
| 2006/0169502 | A1 * | 8/2006 | Kano et al. ............ | 180/65.2 |

FOREIGN PATENT DOCUMENTS

JP    2006-112519 A    4/2006

* cited by examiner

*Primary Examiner* — Jeffrey J Restifo
*Assistant Examiner* — James M Dolak
(74) *Attorney, Agent, or Firm* — Marsh Fischmann & Breyfogle LLP

(57) ABSTRACT

In cooling apparatus for a hybrid vehicle having driving apparatus including a generator driven by an engine and an electric motor (12) for driving the vehicle, the driving apparatus, a radiator arranged in a front portion of an engine compartment and an inverter (41) are coupled by a cooling circuit for the motor equipment. An electric water pump (45) for circulating cooling water is arranged in the cooling circuit. Mounting apparatus (15) for supporting the driving apparatus to the vehicle body is arranged laterally in the vehicle width direction of the driving apparatus. The electric water pump (45) is arranged under the mounting apparatus (15). By the use of such a structure, a situation in which the electric water pump (45) gets sandwiched between the engine radiator which has been shifted backwardly in the presence of an external force acting from the front of the vehicle, and the driving apparatus and gets damaged can be prevented.

2 Claims, 3 Drawing Sheets

HYBRID VEHICLE COOLING APPARATUS

FIELD OF THE INVENTION

The present invention relates to cooling apparatus for a hybrid vehicle and, more particularly, to cooling apparatus for a hybrid vehicle in which protection of an electric water pump is ensured.

BACKGROUND OF THE INVENTION

One type of hybrid vehicle is a hybrid vehicle in which a driving apparatus having a generator that is driven by an engine, a motor for driving the vehicle, and a differential apparatus is arranged at a side portion in a vehicle width direction of the engine, and an inverter for converting electric power which is supplied to the motor for driving the vehicle is arranged over the driving apparatus.

A radiator, the inverter, and the driving apparatus are coupled by a cooling circuit for motor equipment, and an electric water pump for circulating cooling water is arranged to the cooling circuit for the motor equipment.

Japanese published patent application JP-A-2006-112519 discloses an attaching structure for a water pump in which an intermediate plate is arranged between a bracket portion and an electric water pump, a vibration isolating bush is arranged between the electric water pump and the intermediate plate, a vibration isolating bush is arranged between the intermediate plate and the bracket portion, and the electric water pump is attached to a lower portion of a vehicle body side.

In JP-A-2006-112519 however, since the electric water pump is arranged in a space sandwiched between a radiator and a driving apparatus, when an external force acts from a front direction of the vehicle, the radiator which moves in a vehicle rearward direction collides with the electric water pump and there is a danger of the electric water pump being damaged.

SUMMARY OF THE INVENTION

It is, therefore, an object of the invention to provide cooling apparatus for a hybrid vehicle having a structure in which, when an external force acts from a front direction of the vehicle, an electric water pump can be protected, and cooling water that may have leaked from the electric pump is not splashed on peripheral parts.

According to the invention, there is provided cooling apparatus for a hybrid vehicle in which driving apparatus having a generator that is driven by an engine, a motor for driving the vehicle, and a differential apparatus is provided, said driving apparatus is attached at a side portion in a vehicle width direction of said engine which is mounted in an engine compartment, an inverter for converting electric power which is supplied to said motor for driving the vehicle is arranged over said driving apparatus, a radiator which is arranged in a front portion of said engine compartment, said inverter, and said driving apparatus are coupled by a cooling circuit for motor equipment, and an electric water pump for circulating cooling water is arranged to said cooling circuit for the motor equipment, wherein mounting apparatus for supporting said driving apparatus to a vehicle body is arranged laterally in the vehicle width direction of the driving apparatus, and said electric water pump is arranged under the mounting apparatus.

In the cooling apparatus for a hybrid vehicle according to the invention, when an external force acts from a front direction of the vehicle, the electric water pump can be protected and a situation in which cooling water which has leaked from the electric pump gets splashed on peripheral parts can be eliminated.

An embodiment of the invention will be described in detail and specifically hereinbelow with reference to the drawings.

DETAILED DESCRIPTION OF A PREFERRED EMBODIMENT

Figure 1:
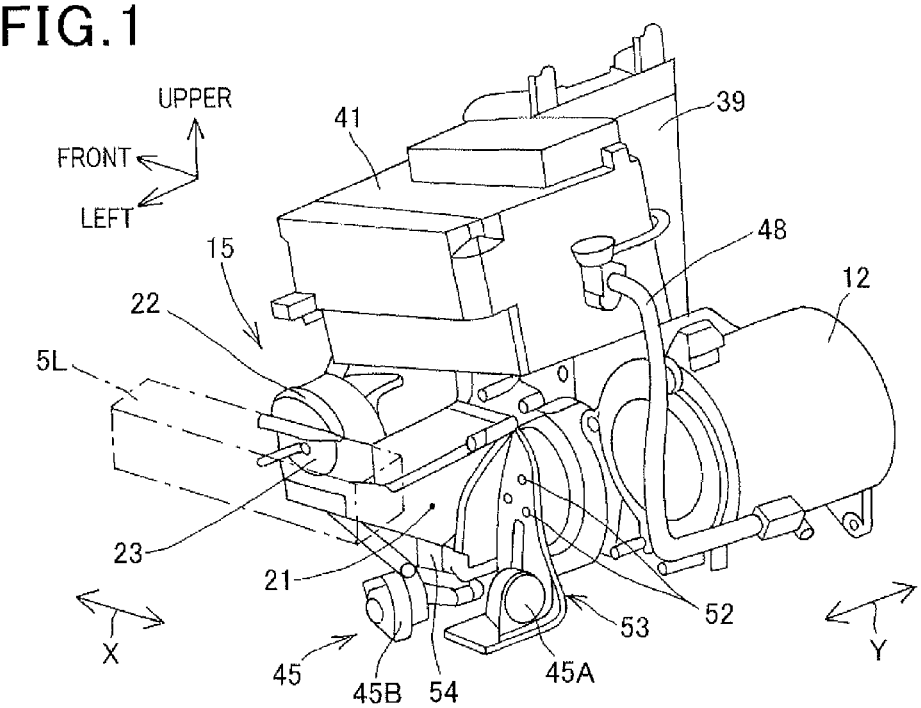
FIG. 1 is a left rear perspective view of a driving apparatus.

According to the invention, the aim of protecting an electric water pump when an external force acts from a front direction of the vehicle and of preventing cooling water that has leaked from the electric pump getting splashed on peripheral parts is achieved by a construction in which mounting apparatus for supporting driving apparatus to a vehicle body is arranged laterally in a vehicle width direction of the driving apparatus and the electric water pump is arranged under the mounting apparatus.

FIGS. 1 to 5 illustrate the embodiment of the invention.

In FIGS. 1 to 4, reference numeral 1 denotes a hybrid vehicle (hereinbelow, referred to as "vehicle"); 2 a vehicle body; 3R and 3L a right front wheel and a left front wheel; 4 a vehicle body; 5R and 5L a right side frame and a left side frame making up the vehicle body 4; 6 an engine compartment; and 7 a dash panel.

A power unit 8 is mounted in the engine compartment 6. The power unit 8 is made up by an engine 9 and a driving apparatus 10 coupled with the engine 9.

Figure 4:
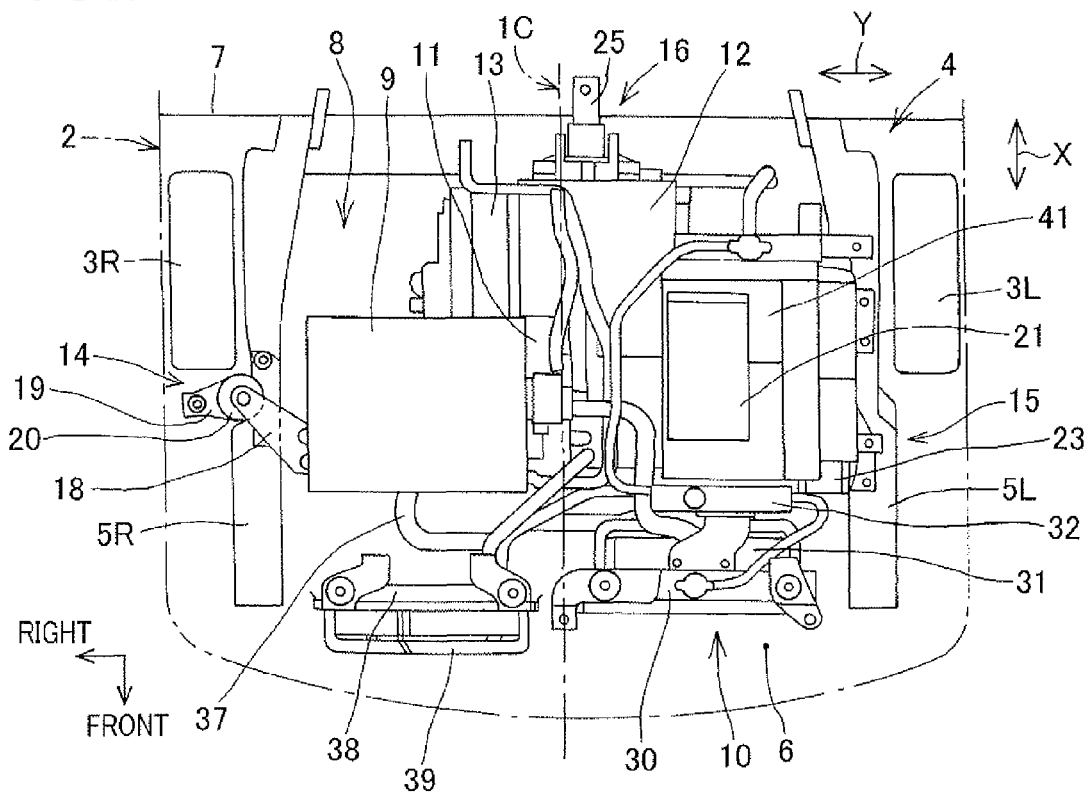
FIG. 4 is a plan view of the vehicle front portion.

As illustrated in FIG. 4, the engine 9 is arranged on the right side of a vehicle center line 1C.

The driving apparatus 10 has a generator 11 which is driven by the engine 9, a motor 12 for driving the vehicle, and a differential apparatus 13 and is attached to a side portion in a vehicle width direction Y of the engine 9. That is, in the driving apparatus 10, the generator 11 is coupled with a left edge portion of the engine 9. The motor 12 for driving the vehicle is arranged at almost the same position as that of the generator 11 and behind the generator 11 in a vehicle front/rear direction X. The differential apparatus 13 is arranged on the vehicle right side of the motor 12 and under motor 12.

A right edge portion of the power unit 8 is elastically supported to the right side frame 5R by a right side mounting apparatus 14 coupled with the engine 9, a left edge portion is elastically supported to the left side frame 5L by left side mounting apparatus 15 coupled with the generator 11, and a rear edge portion is elastically supported to a rear side crossmember 17 by a rear side mounting apparatus 16 at a center portion coupled with the motor 12 for driving the vehicle.

Figure 2:
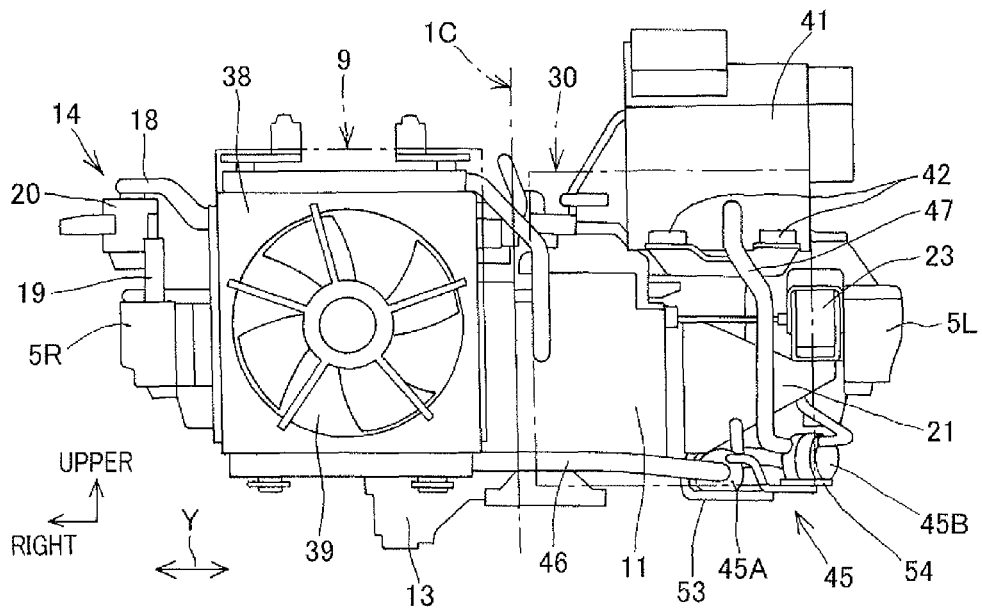
FIG. 2 is a front view of the driving apparatus.

As shown in FIG. 2, the right side mounting apparatus 14 has: a right side unit mount bracket 18 coupled with the engine 9; a right side vehicle body mount bracket 19 coupled with the right side frame 5R; and right side mount rubber 20 provided between the mount bracket 18 for the right side unit and the mount bracket 19 for the right side vehicle body. The right side mounting apparatus 14 elastically supports the right edge portion of the power unit 8 to the right side frame 5R.

As shown in FIGS. 1 and 2, the left side mounting apparatus 15 has: a left side unit mount bracket 21 coupled with the generator 11; a left side vehicle body mount bracket 22 coupled with the left side frame 5L; and left side mount rubber 23 provided between the mount bracket 21 for the left side unit and the mount bracket 22 for the left side vehicle body. The left side mounting apparatus 15 elastically supports the left edge portion of the power unit 8 to the left side frame 5L.

Figure 3:
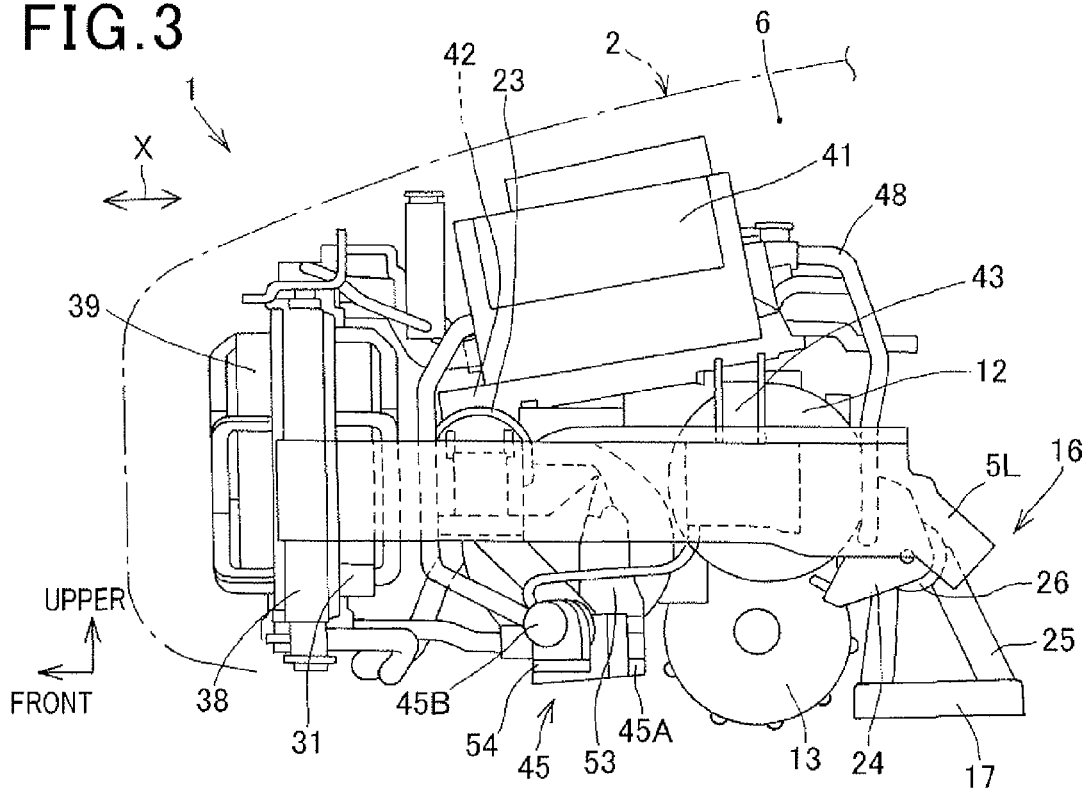
FIG. 3 is a left side elevational view of a vehicle front portion.

As shown in FIGS. 3 and 4, the rear side mounting apparatus 16 has: a rear side unit mount bracket 24 coupled with the motor 12 for driving the vehicle; a rear side vehicle body mount bracket 25 coupled with the rear side cross-member 17; and rear side mount rubber 26 provided between the mount bracket 24 for the rear side unit and the mount bracket 25 for the rear side vehicle body. The rear side mounting apparatus 16 elastically supports the rear edge portion of the power unit 8 to the rear side cross-member 17.

Figure 5:
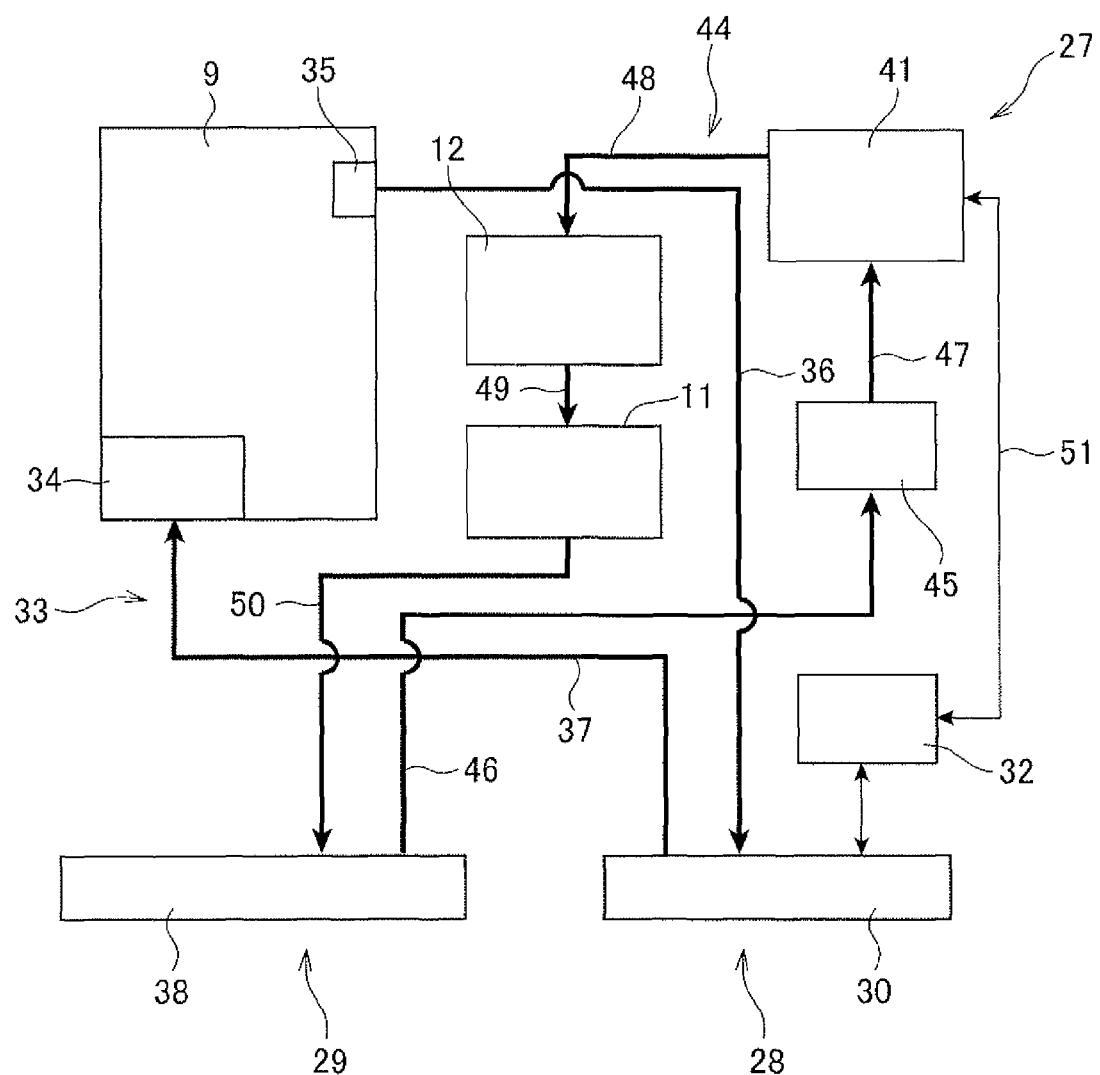
FIG. 5 is a system constructional diagram of cooling apparatus.

As shown in FIG. 5, cooling apparatus 27 is provided for the vehicle 1. The cooling apparatus 27 is made up by: an engine cooling apparatus 28 for cooling the engine 9; and a driving apparatus cooling apparatus 29 for cooling the driving apparatus 10 and an inverter 41, which will be described hereinafter.

In the engine cooling apparatus 28, as shown in FIGS. 2 to 4, an engine radiator 30 for cooling the engine cooling water of engine 9 is arranged in a front portion of the driving apparatus 10. A cooling fan 31 for the engine is attached to a rear portion of the radiator 30 for the engine. A reserve tank 32 is arranged behind the cooling fan 31 for the engine.

As shown in FIG. 5, in the engine 9, an engine water pump 34 for circulating the cooling water for the engine 9 by a cooling circuit 33 for the engine is provided at a cooling water inlet, and a thermostat 35 is provided at a cooling water outlet.

As shown in FIG. 5, the cooling circuit 33 for the engine has: a first engine cooling water pipe 36 between the thermostat 35 and the radiator 30 for the engine; and a second engine cooling water pipe 37 between the radiator 30 for the engine and the water pump 34 for the engine.

In the cooling apparatus 29 for the driving apparatus, as shown in FIGS. 2 to 4, a driving apparatus radiator 38 for cooling the cooling water of the driving apparatus 10 is arranged in a front portion of the engine 9. A cooling fan 39 for the driving apparatus is attached to a front portion of the radiator 38 for the driving apparatus.

As shown in FIGS. 1 to 3, the inverter 41 for converting electric power which is supplied to the motor 12 for driving the vehicle is arranged over the driving apparatus 10. The inverter 41 is arranged in spaces over the generator 11 and the motor 12 through a front side attaching bracket 42 and a rear side attaching bracket 43 in each of which a left edge portion is coupled with the left side frame 5L.

As shown in FIG. 5, the driving apparatus radiator 38 which is arranged in a front portion of the engine compartment 6, the inverter 41, and the driving apparatus 10 are coupled by a cooling circuit 44 for the motor equipment. An electric water pump 45 for circulating the cooling water is arranged in the cooling circuit 44 for the motor equipment.

As shown in FIG. 5, the cooling circuit 44 for the motor equipment has: a first motor equipment cooling water pipe 46 arranged between the radiator 38 for the driving apparatus and the electric water pump 45; a second motor equipment cooling water pipe 47 arranged between the electric water pump 45 and the inverter 41; a third motor equipment cooling water pipe 48 arranged between the inverter 41 and the motor 12 for driving the vehicle; a fourth motor equipment cooling water pipe 49 arranged between the motor 12 for driving the vehicle and the generator 11; and a fifth motor equipment cooling water pipe 50 arranged between the generator 11 and the radiator 38 for the driving apparatus. The inverter 41 and the reserve tank 32 are coupled by a communicating cooling water pipe 51.

As shown in FIG. 5, regarding electric water pump 45, the left side mounting apparatus 15 serving as a mounting apparatus for supporting the driving apparatus 10 to the vehicle body 4 is arranged on the left side in the vehicle width direction Y of the driving apparatus 10. The electric water pump 45 is arranged under the left side mounting apparatus 15 and, accordingly, is arranged in a lower portion in a vertical direction of the cooling circuit 44 for the motor equipment.

Electric water pump 45 is made up by a plurality of pumps comprising a first electric water pump 45A and a second electric water pump 45B. As shown in FIGS. 1 and 2, the first electric water pump 45A is supported by a first pump supporting bracket 53 fixed to the side surface of the mount bracket 21 for the left side unit by a plurality of bracket attaching bolts 52 and is arranged in a space under the mount bracket 21 for the left side unit. The second electric water pump 45B is supported by a second pump supporting bracket 54 fixed to a lower portion of the mount bracket 21 for the left side unit and is arranged in the space under the mount bracket 21 for the left side unit.

An embodiment of the invention has been described above. The construction of the foregoing embodiment as set out in each Claim will be reviewed.

First, in the invention according to Claim 1, the left side mounting apparatus 15 serving as a mounting apparatus for supporting the driving apparatus 10 to the vehicle body 4 is arranged on the left side in the vehicle width direction Y of the driving apparatus 10 and the electric water pump 45 is arranged under the left side mounting apparatus 15.

By the use of such a structure, a situation in which the electric water pump 45 gets sandwiched between the engine radiator 30 which has moved rearwardly in the presence of an external force acting from the front of the vehicle, and the driving apparatus 10 and suffers damage can be prevented. Since the electric water pump 45 can be arranged in the lower portion in the vertical direction in the cooling circuit 44 for the motor equipment, when cooling water does leak from the electric water pump 45, a situation in which cooling water gets splashed on the peripheral parts can be prevented. Further, since the electric water pump 45 can be arranged in the lower portion in the vertical direction in the cooling circuit 44 for the motor equipment, a situation in which air mixed in with the water in the cooling circuit 44 for the motor equipment remains in the electric water pump 45 and causes an air lock for the cooling water can be prevented.

In the invention according to Claim 2, the left side mounting apparatus 15 has the left side unit mount bracket 21 serving as a mount bracket in which one end is coupled with the driving apparatus 10 and the other end is elastically supported to the vehicle body 4, and the electric water pump 45 is supported to the mount bracket 21 for the left side unit.

Thus, when an external force acts from the front direction of the vehicle, the mount bracket 21 for the left side unit functions as a guard for preventing peripheral parts colliding with the electric water pump 45, thereby ensuring the electric water pump 45 is protected. Electric water pump 45 can be assembled to the driving apparatus 10 in a state where it is integrated with the mount bracket 21 for the left side unit and an assembly performance of electric water pump 45 can be improved.

The cooling apparatus of the invention can be applied to various kinds of vehicle.

LIST OF REFERENCE NUMERALS
- 1 . . . Vehicle
- 4 . . . Vehicle body
- 6 . . . Engine compartment
- 8 . . . Power unit
- 9 . . . Engine
- 10 . . . Driving apparatus
- 11 . . . Generator
- 12 . . . Motor for driving the vehicle
- 13 . . . Differential apparatus
- 14 . . . Right side mounting apparatus
- 15 . . . Left side mounting apparatus
- 16 . . . Rear side mounting apparatus
- 21 . . . Mount bracket for a left side unit
- 22 . . . Mount bracket for a left side vehicle body
- 23 . . . Left side mount rubber
- 27 . . . Cooling apparatus
- 30 . . . Radiator for the engine
- 33 . . . Cooling circuit for the engine
- 38 . . . Radiator for a driving apparatus
- 41 . . . Inverter
- 44 . . . Cooling circuit for motor equipment
- 45 . . . Electric water pump

What is claimed is:

1. A cooling apparatus for a hybrid vehicle in which a driving apparatus having a generator that is driven by an engine, a motor for driving the vehicle, and a differential apparatus is provided, said driving apparatus is attached at a side portion in a vehicle width direction of said engine which is mounted in an engine compartment, said generator is coupled with an edge portion of the engine, said motor is arranged behind the generator in a vehicle front-to-rear direction, an inverter for converting electric power which is supplied to said motor for driving the vehicle is arranged in spaces over the generator and the motor through attaching brackets in each of which an edge portion of the attaching brackets is coupled with a side frame of the vehicle, a radiator is arranged in a front of said driving apparatus, said inverter and said driving apparatus are coupled by a cooling circuit for motor equipment, and an electric water pump for circulating cooling water in said cooling circuit is arranged behind the radiator in the vehicle front-to-rear direction, wherein a mounting apparatus for supporting said driving apparatus to a vehicle body is arranged laterally in the vehicle width direction of the driving apparatus, said mounting apparatus has a mount bracket in which one end is coupled with the generator and the other end is elastically supported to said vehicle body, and said electric water pump is arranged under said mount bracket.

2. The cooling apparatus for a hybrid vehicle according to claim 1, wherein said electric water pump is fixed to said mount bracket by a pump supporting bracket.

* * * * *